United States Patent
Weber

(10) Patent No.: US 6,951,426 B2
(45) Date of Patent: Oct. 4, 2005

(54) PAD ARCHITECTURE FOR BACKWARDS COMPATIBILITY FOR BI-DIRECTIONAL TRANSCEIVER MODULE

(75) Inventor: Andreas Weber, Los Altos, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/791,435

(22) Filed: Mar. 2, 2004

(65) Prior Publication Data

US 2004/0175077 A1 Sep. 9, 2004

Related U.S. Application Data

(60) Provisional application No. 60/452,249, filed on Mar. 5, 2003.

(51) Int. Cl.[7] ............................. G02B 6/42; H04B 10/12
(52) U.S. Cl. ......................................... 385/88; 398/135
(58) Field of Search ....................... 385/88–94; 439/951

(56) References Cited

U.S. PATENT DOCUMENTS

| | | |
|---|---|---|
| 5,479,540 A | 12/1995 | Boudreau et al. |
| 6,434,015 B1 | 8/2002 | Hwang |
| 6,516,115 B1 | 2/2003 | Fujita et al. |
| 6,554,492 B2 * | 4/2003 | Gilliland et al. .............. 385/88 |

* cited by examiner

Primary Examiner—John D. Lee
Assistant Examiner—Sarah Song
(74) Attorney, Agent, or Firm—Workman Nydegger

(57) ABSTRACT

Exemplary embodiments of the present invention selectively adapt the pad architecture on bi-directional opto-electronic transceiver modules to connect to legacy unidirectional ports, panels and the like. This allows the bi-directional module to function correctly when connected to either a unidirectional or a bi-directional port. Conversely, exemplary embodiments also selectively adapt the pad architecture on bi-directional patch panels or ports to connect to legacy unidirectional optoelectronic transceiver modules. This allows the port to function correctly when either a bi-directional or a unidirectional transceiver is connected to it.

25 Claims, 4 Drawing Sheets

| PAD | SFP MSA | Adapted Config. |
|---|---|---|
| 1 | VeeT | VeeT |
| 2 | Tx_fault | Tx_fault: T1 |
| 3 | Tx_dis | Tx_dis: T1 |
| 4 | mod-def2 | mod-def2 |
| 5 | mod-def1 | mod-def1 |
| 6 | mod-def0 | T2+ (with pulldown) |
| 7 | rate select | T2- |
| 8 | LOS | LOS: R1 |
| 9 | VeeR | R2+ |
| 10 | VeeR | R2- |
| 11 | VeeR | VeeR |
| 12 | R- | R1- |
| 13 | R+ | R1+ |
| 14 | VeeR | VeeR |
| 15 | VccR | VccR |
| 16 | VccT | VccT |
| 17 | VeeT | VeeT |
| 18 | T+ | T1+ |
| 19 | T- | T1- |
| 20 | VeeT | VeeT |

510 / 512 / 514

500

| PAD | SFP MSA | Adapted Config. |
|---|---|---|
| 1 | VeeT | VeeT |
| 2 | Tx_fault | Tx_fault: T1 |
| 3 | Tx_dis | Tx_dis: T1 |
| 4 | mod-def2 | mod-def2 |
| 5 | mod-def1 | mod-def1 |
| 6 | mod-def0 | T2+ (with pulldown) |
| 7 | rate select | T2- |
| 8 | LOS | LOS: R1 |
| 9 | VeeR | R2+ |
| 10 | VeeR | R2- |
| 11 | VeeR | VeeR |
| 12 | R- | R1- |
| 13 | R+ | R1+ |
| 14 | VeeR | VeeR |
| 15 | VccR | VccR |
| 16 | VccT | VccT |
| 17 | VeeT | VeeT |
| 18 | T+ | T1+ |
| 19 | T- | T1- |
| 20 | VeeT | VeeT |

Fig. 5C

PAD ARCHITECTURE FOR BACKWARDS COMPATIBILITY FOR BI-DIRECTIONAL TRANSCEIVER MODULE

CROSS REFERENCE TO RELATED APPLICATIONS

This application claims priority to and the benefit of U.S. Provisional Patent Application Ser. No. 60/452,249, dated Mar. 5, 2003 and entitled "Pin Architecture for Backwards Compatibility for Bi-Directional Transceiver Modules", which is incorporated herein by reference in its entirety.

BACKGROUND OF THE INVENTION

1. The Field of the Invention

Embodiments of the present invention relate to interfaces between optical transceivers and computers or communications devices that operate with the transceivers. More particularly, exemplary embodiments of the present invention relate to an electrical pad architecture that permits interoperability between optical transceiver modules and computers or communications devices.

2. The Relevant Technology

In the field of data transmission, one method of efficiently transporting data is through the use of fiber optics. Typically, data transmission via fiber optics is implemented by way of an optical transmitter, such as a light emitting diode or laser, while data reception is generally implemented by way of an optical receiver, such as a photodiode. Light signals allow for extremely high transmission rates and very high bandwidth capabilities. Also, light signals are resistant to electromagnetic interferences that would otherwise interfere with electrical signals. Light signals are more secure because they do not allow portions of the signal to escape from the fiber optic cable as can occur with electrical signals in wire-based systems. Light also can be conducted over greater distances without the signal loss typically associated with electrical signals on copper wire.

As with copper wire or other conductors, optical cables allow for the bi-directional flow of data. One method of achieving bi-directional communication is through the use of two fiber optic cables. A first cable can be used to transmit data from a first communications device to a second communications device and the second cable can be used for transmitting data from the second communications device to the first communications device. Such a configuration is depicted in FIG. 1, which depicts a standard small form factor pluggable (SFP) connector configuration 100.

Connector configuration 100 includes a first communications module 102 and a second communications module 104 connected by a first cable 106 and a second cable 108. A transmitter 110 in first communications module 102 is connected via first cable 106 to a receiver 112 in second communications module 104. Similarly, a transmitter 114 in second communications module 104 is connected via a second cable 108 to a receiver 116 in first communications module 102. Thus, data is transmitted between first communications module 102 and second communications module 104 unidirectionally on each of cables 106, 108 from transceivers 110, 114 to receivers 112, 116, respectively.

Nevertheless, it is often desirable to limit the number of fiber optic cables between two communication points to save on material costs and installation. The link density is also limited by the number of fiber optic connectors that can be fitted on the face plate of a switch box containing an array of transceivers. This need has led to the development of bi-directional systems that limit the number of cables (and connectors) by both sending and receiving data on the same fiber optic cable. This is possible because of the directional nature of an optical signal propagating along a fiber optic cable. Generally, the use of circulators or beam splitters makes bi-directional communication possible on a single fiber optic cable.

A conventional bi-directional transceiver module configuration 200 is depicted in FIG. 2. This method of bi-directional communication along a single fiber-optic cable involves the use of lasers with different wavelengths. Commonly, a 1550 nanometer distributed feedback (DFB) laser is used to propagate an optical signal in one direction, while a 1310 nanometer Fabry Perot laser (FP) is used to propagate the optical signal in the opposite direction. This configuration has some drawbacks. The configuration requires two types of complementary transceivers, with different transceivers being used at the two communications devices engaging in the bi-directional communication. For example, one communications device must have a transceiver with a 1550 nanometer transmitter and a 1310 nanometer receiver, while the other communications devices must have a complementary transceiver having a 1310 nanometer transmitter and a 1550 nanometer receiver.

This bi-directional configuration 200 allows bi-directional data transmission between a first module 202 and a second module 204 via a single cable 206. In this configuration, each of the first and second modules 202, 204 has a transmitter 208, 210, respectively, for transmitting at a distinct wavelength from the other. Consequently, first module 202 transmits at a first wavelength (e.g. 1550 nanometers) and second module 204 transmits at a second wavelength (e.g. 1310 nanometers). Similarly, first module 202 has a first receiver 212 for receiving signals propagated at the second wavelength. Second module 204 has a second receiver 214 for receiving signals propagated at the first wavelength. First and second modules 202, 204 as depicted, also contain beam splitters 216, 218, respectively. Beam splitters 216, 218 separate incoming signals propagated at one wavelength from outgoing signals propagated at a different wavelength. The first and second modules 202, 204 are structurally distinct. They must be carefully paired so that each can receive the proper signal transmitted by the opposing module. However, industry standards are changing.

The telecommunications industry has a continuous need to both increase data transmission rates and to migrate from larger to smaller devices without sacrificing data transmission rates. For example, gigabit interface connectors (GBIC) are being replaced by small form factor connectors, often small form factor pluggable (SFP) connectors. GBIC converters include an interface module that converts the light signal from a fiber channel cable into electronic signals for use by a network interface card. SFP connectors provide the same functionality as a regular GBIC connector but in a smaller and denser physical size. Nevertheless, because of the large volume of legacy cable and connector systems that are already in use, the need for smaller and faster systems is tempered by the desire to avoid replacing existing cables and other legacy devices.

One recent approach utilizes existing Lucent Connector (LC) cables. These LC cables have paired fibers, each of which conventionally transmits optical data unidirectionally. This approach uses each cable for bi-directional data transmission and does not require two types of modules since both transceivers in the module are identical. This transceiver module requires a total of four lasers and four photodetectors, or one for each of two distinct wavelengths that are transmitted in opposite directions in each of the two cables. The modules require a complex negotiation procedure by which opposing transceiver modules at either end of an optical cable communicate to determine the wavelengths that each will send and each will receive.

Another bi-directional approach to increasing data transmission capacity on existing dual cable systems is to transmit signals in opposing directions along a single wavelength on each optical cable, thus requiring only one transmitter and one receiver at each end of each optical cable. However, the use of identical wavelengths results in a problematic optical reflection that can be caused by the fiber interconnects. A receiver sees the data transmissions from the transmitters at both ends of the optical cable rather than just the intended transmitter at the opposite end of the optical cable. This system therefore requires the use of complex echo cancellation devices to remove the reflected data transmissions that are not intended to reach the receiver.

As noted above, various optical transceiver modules for communicating bi-directional signals on optical fibers have been developed. These transceiver modules can use optical fiber infrastructures more efficiently and can provide a higher transceiver density in the chassis or patch panel receiving the transceivers. However, it is often difficult for network administrators to adopt such bi-directional optical transceiver modules because of the existing and expensive communications devices that are configured for use with unidirectional transceivers.

For example, the Small Form-Factor Pluggable Transceiver Multi-Source Agreement (SFP MSA), which is incorporated herein by reference, specifies a specific pad architecture. Pads are electrical contacts generally formed on a flat surface that electrically connect a module, such as a transceiver module, to a patch panel or other device. The pads are a male portion of a connector, while the corresponding female portion is found in the patch panel. In some applications, the pads are found on both a top surface and a bottom surface of a portion of an optoelectronic module. The SFP MSA defines specific uses for the pads. However, the SFP MSA was not created to support small form factor pluggable optical transceiver modules that use bi-directional communication. Thus, the use of bi-directional transceivers generally has required the acquisition of communications devices that can electrically interface with the bi-directional transceiver modules to receive and transmit data. This has resulted in the abandonment of otherwise state-of-the-art communications devices that operate according to, for example, the SFP MSA.

BRIEF SUMMARY OF THE EXEMPLARY EMBODIMENTS

Exemplary embodiments of the present invention overcome the limitations discussed above by selectively adapting the pad architecture on bi-directional optoelectronic transceiver modules to connect to legacy unidirectional ports, panels, and the like. Conversely, exemplary embodiments also selectively adapt the pad architecture on bi-directional patch panels or ports to connect to legacy unidirectional optoelectronic transceiver modules.

Optoelectronic transceivers built according to the Small Form-Factor Pluggable Transceiver Multi-Source Agreement (SFP MSA) use twenty pads or a twenty pad architecture to connect the Small Form Factor (SFP) module and the port or patch panel receiving the SFP module. In one exemplary embodiment, the functions of one or more of the pads on a bi-directional transceiver module are altered so that a transceiver module can function in either of a bi-directional mode or a unidirectional mode. The alteration allows the module to connect to either a bi-directional or unidirectional port. The module can have a pair of transmitters and a pair of receivers. When connecting to a unidirectional port, the pads that connect the second transmitter and receiver are idle, while the pads that connect the first transmitter and receiver are adapted to provide electrical connections to the unidirectional port.

Optoelectronic transceivers can also be built according to other standards, such as but not limited to, the standards associated with 10 Gigabit Small Form Factor Pluggable (XFP) modules. The XFP module uses thirty pads or thirty pad architecture to connect the XFP module and the port or patch panel receiving the XFP module. In one exemplary embodiment, the functions of one or more of the pads on a bi-directional transceiver module are altered so that a transceiver module can function in either of a bi-directional mode or a unidirectional mode. The alteration allows the module to connect to either a bi-directional or unidirectional port. The module can have a pair of transmitters and a pair of receivers. When connecting to a unidirectional port, the pads that connect the second transmitter and receiver are idle, while the pads that connect the first transmitter and receiver are adapted to provide electrical connections to the unidirectional port.

In an alternate exemplary embodiment, the functions of some pads on the bi-directional port or panel are altered. The alteration allows the bi-directional panel to accept either bi-directional or unidirectional transceiver modules to connect and function correctly. When connecting a unidirectional module, for example, an SFP module or XFP module, to the port, the pads in the port that connect the second transmitter and receiver in a bi-directional module are idle. This allows a single photonic module to function with either bi-directional and unidirectional ports or patch panels without modifying the structure of the photonic module. Hence, the present invention advantageously reduces costs and the complexity of interfacing bi-directional and unidirectional system.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which:

FIG. 5C sets forth one exemplary embodiment of a pad architecture for SFP optical transceiver modules and the adaptation thereof to support bi-directional optical transceiver modules

DETAILED DESCRIPTION OF THE EXEMPLARY EMBODIMENTS

Figure 1:
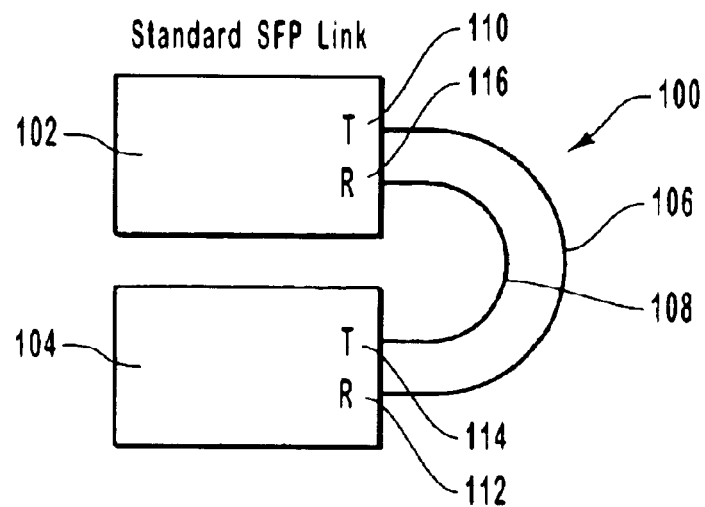
FIG. 1 is a prior art schematic diagram of a bi-directional transceiver module system.
Figure 2:
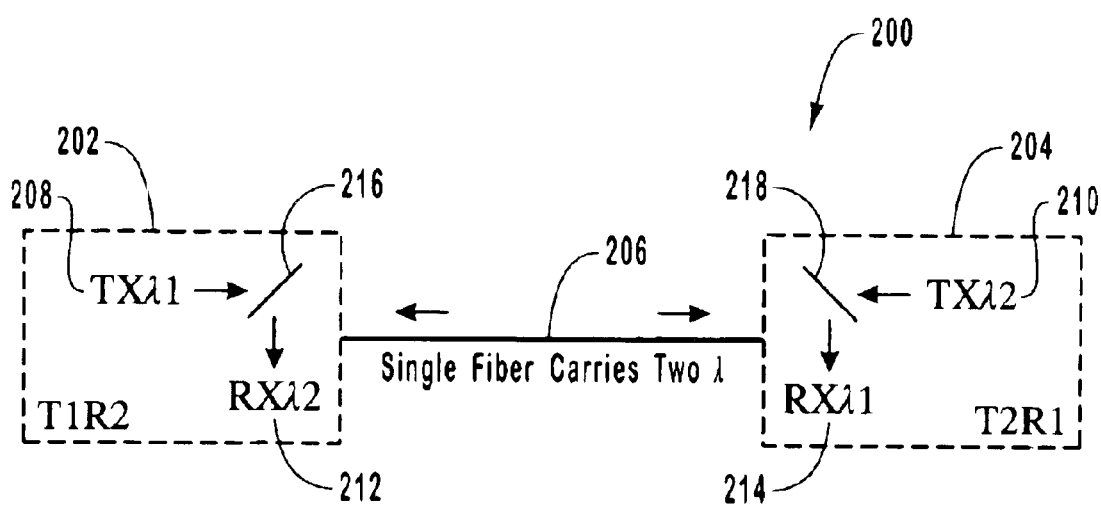
FIG. 2 is a prior art schematic diagram of an SFP transceiver module system.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale. In the following description, numerous specific details are set forth in order to provide a thorough understanding of the present invention. It will be obvious, however, to one skilled in the art, that the exemplary embodiments of the present invention may be practiced without these specific details. In other instances, well-known aspects of optical systems have not been described in particular detail in order to avoid unnecessarily obscuring the present invention.

While the exemplary embodiments of the invention discussed below are well-suited for use in conjunction with a high speed data transmission system conforming to the small form factor pluggable (SFP) standards, such operating environment is exemplary only and embodiments of the invention may be employed in any of a variety of optical data transmission systems. For instance, the invention also applies to systems conforming to 10 Gigabit small form factor pluggable (XFP) standards.

According to one exemplary embodiment of the invention, provided is a module, such as but not limited to, an optical transceiver module that can operate with either a bi-directional communication device or a unidirectional communication device without changing the physical structure of the module. This allows a single module to be interchangeably used with various communication devices. A "communications device" as used herein, refers to any hardware device that sends electrical signals to or receives electrical signal from an optical transceiver module, whether or not such hardware device operates in a bi-directional module or a unidirectional mode. This hardware device may include one or more ports that receive the optical transceiver module. Examples of communications devices include, but are not limited to, individual computers, communications boxes, and patch panels having a chassis that provides a plurality of ports. The ports are designed to interface electrically with the optical transceiver module.

A communication device that operates with unidirectional optical communication may be termed a "legacy" communication device. The term "legacy" refers to a communication infrastructure that is designed to operate with unidirectional optical communication, and extends to unidirectional optical transceiver modules and communications devices designed to operate with unidirectional optical transceiver modules. One example of a legacy device is a communications device or an optical transceiver module constructed according to the SFP MSA.

As mentioned above, the present invention provides a transceiver module that is backward compatible, i.e., that can function with both unidirectional and bi-directional communication devices. The transceiver modules of the present invention enable interoperability of legacy components and bi-direction components that is currently impossible.

In general, the use of a bi-directional component and a legacy unidirectional component permits the bi-directional component to operate in a unidirectional manner. The combination of bi-directional components and legacy unidirectional components does not result in bi-directional signals being propagated over an optical fiber. However, exemplary embodiments of the invention do permit the legacy and bi-directional components to communicate using unidirectional optical signals. In contrast, conventional systems would be inoperative if an attempt were made to combine legacy unidirectional components with bi-directional components. Exemplary embodiments of the invention allow network administrators to begin to adopt bi-directional components without losing the entire value of their previous investment in legacy hardware. The network administrators can continue to use much of their legacy hardware while selectively introducing the use of bi-directional components.

The interoperability of bi-directional components can take many forms. For example, a bi-directional optical transceiver module can be used with a legacy communications device without modifying the existing connectors or architecture of the communications device. Similarly, a communications device that is otherwise capable of operating with bi-directional optical transceiver modules can connect to and communicate with a legacy unidirectional transceiver module. In addition, a communications device, whether legacy or bi-directional, can operate using a combination of legacy and bi-directional optical transceiver modules. In other words, exemplary embodiments of the present invention enable bi-directional components to be backwards compatible with legacy components in a broad range of configurations.

This document describes an example of a bi-directional optical transceiver module with which exemplary embodiments of the invention can be used. However, the bi-directional optical transceiver module described in detail below is just one example of the bi-directional modules that can be used according to exemplary embodiments of the invention to operate in a unidirectional manner when connected to a communications device. Other examples can include conventional bi-directional optical transceiver modules. In general, exemplary embodiments of the present invention can be used with bi-directional optical transceiver modules that operate in substantially any manner so long as the components of the optical transceiver module can be housed in a structure that is compatible with the required pad architecture.

1. Example of Bi-Directional Optical Transceiver Module

One example of bi-directional optical transceiver modules that can operate according to exemplary embodiments of the invention is a small form factor transceiver module that is modified to have a pair of bi-directional optical assemblies, each with a transmitter and a receiver. This advantageously allows each of the two optical cables that connect with the transceiver module to carry bi-directional optical signals, thereby doubling the data transmission capacity of the cables without changing the size of the cables or transceiver modules.

Figure 3:
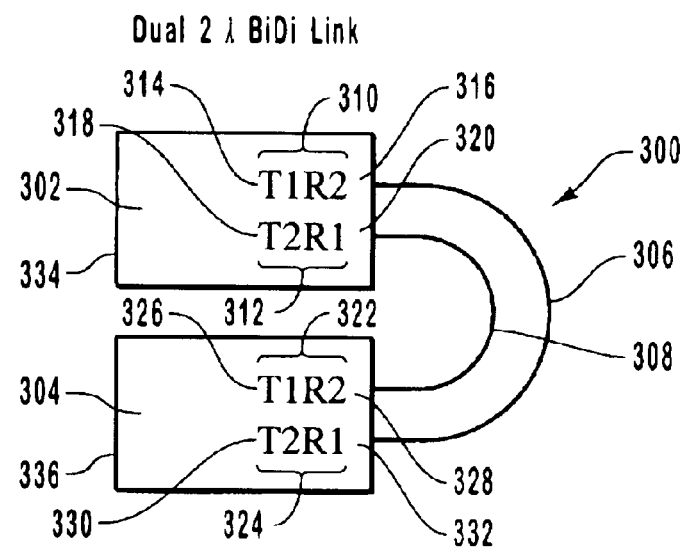
FIG. 3 is a schematic diagram that illustrates aspects of a bi-directional transceiver module according to an exemplary embodiment of the present invention.

FIG. 3 is a schematic diagram that illustrates aspects of one example of a dual wavelength bi-directional link system, designated generally as reference numeral 300. More particularly, FIG. 3 depicts a first bi-directional communications module 302 and a second bi-directional communications module 304 connected by a first cable 306 and a second cable 308. First and second cables 306, 308 may include legacy cables (connected to legacy connectors) so that the exemplary embodiments of the present invention may be implemented without necessitating any change in existing cables and connectors, thereby reducing the implementation costs of this module.

Although first and second cables 306 and 308 are therefore potentially identical in structure to first cable 106 and second cable 108 from the prior art system depicted in FIG. 1, first and second cables 306 and 308 are utilized differently than they would be used by conventional systems. They have bi-directional optical data flowing along their lengths rather than the unidirectional flow that is directed through first cable 106 and second cable 108. Thus, the embodiment illustrated in FIG. 3 greatly increases the utilization of the existing fiber optic infrastructure.

First bi-directional communications module 302 and second bi-directional communications module 304 can be identical modules, each having a pair of bi-directional subassemblies therein. For example, first module 302 can have first and second bi-directional sub-assemblies 310, 312. Second module 304 can have first and second bi-directional sub-assemblies 322, 324. Each of the bi-directional subassemblies 310, 312, 322, 324 is in communication with one end of one of cables 306, 308. Each bi-directional subassembly 310, 312, 322, 324 includes a transmitter and receiver pair. For example, in first module 302 the subassembly 310 includes a transmitter 314 and a receiver 316, while subassembly 312 includes a transmitter 318 and a receiver 320. Similarly, in second module 304 the subassembly 322 includes a transmitter 326 and a receiver 326, while subassembly 324 includes a transmitter 330 and a receiver 332. Receivers 316, 320, 326, and 332 can include a photodetector such as, by way of example only, a Longwave PIN diode manufactured by Sensors Unlimited, part number 1008696, or other photodetectors known in the art. It can be understood by those skilled in the art that each receiver 316, 320, 326, and 332 can be a receiver optical subassembly (ROSA), such as one of those known to those skilled in the art.

Transmitter 314 of subassembly 310 in first bi-directional module 302, can be, by way of example only, a 1550 nanometer distributed feedback (DFB) laser. Transmitter 314 thereby provides a first wavelength data transmission that is propagated through first cable 306 and received by receiver 332 of subassembly 324 in second bi-directional communications module 304. Transmitter 330 of subassembly 324 in second bi-directional module 304 can be, also by way of example only, a 1310 nanometer Fabry Perot (FP) Laser. Transmitter 330 thereby provides a second wavelength data transmission that is propagated through first cable 306 in a direction opposite the first wavelength. This second wavelength data transmission is received by receiver 316 of subassembly 310 in second bi-directional communications module 302. The transmitters and receivers in subassemblies 312 and 326 operate similarly.

According to this example of bi-directional optical transceiver modules, the wavelengths of the signals traveling in opposite directions on a single fiber are sufficiently different to prevent the receivers from experiencing optical crosstalk due to internal reflection from the outgoing optical signals. No complex echo cancellation device is required to remove the crosstalk.

Although reference is made to each transmitter 314, 318, 326, 330 being a laser, it can be understood by those skilled in the art that each transmitter 314, 318, 326, 330 can be a transmitter optical subassembly (TOSA), such as one of those known to those skilled in the art.

The bi-directional communications modules 302, 304 also include a module casing 334, 336 configured to house or provide attachment points for other components included in the bi-directional communications modules 302, 304. The bi-directional communications modules 302, 304 further include duplex connectors (not depicted) disposed on the module casing 334, 336 configured to mate with connectors (not depicted) affixed to cables 306, 308. Other conventional elements of bi-directional communications modules can be included in bi-directional communications modules 302, 304 as necessary or desired.

Figure 4:
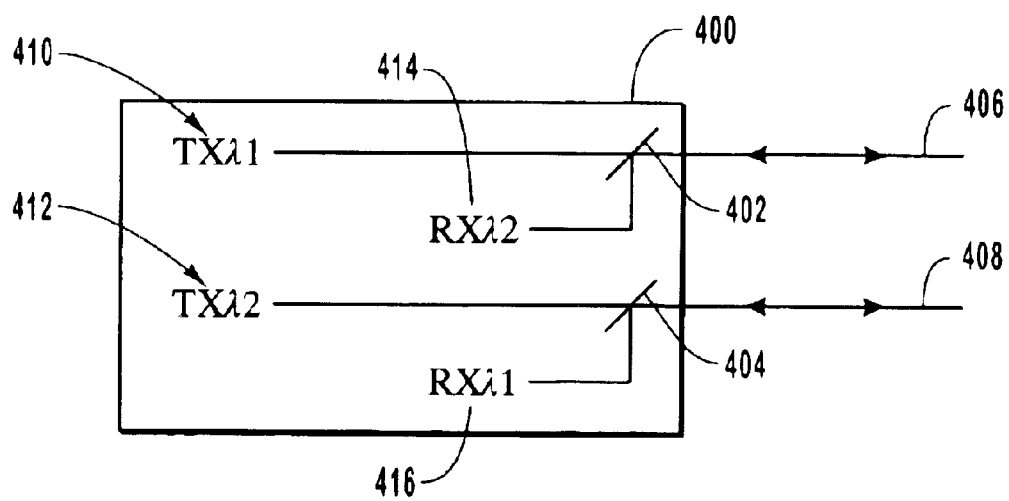
FIG. 4 is another schematic diagram that illustrates aspects of a bi-directional transceiver module according to an alternate exemplary embodiment.

Referring now to FIG. 4, bi-directional communications module 400 can advantageously incorporate beam splitters 402, 404. Beam splitters 402, 404 can be, by way of example only, near-IR dielectric mirrors, model 5152, manufactured by New Focus, or other beam splitters known to those of skill in the art. The beam splitters 402, 404 are positioned between optical cables 406, 408, transmitters 410, 412, and receivers 414, 416, respectively. Thus, for example, a properly selected beam splitter 402 receives a signal from transmitter 410 containing a first signal along a first wavelength and passes it to cable 406. From an opposite direction, beam splitter 402 also receives a second signal via cable 406 containing data along the second wavelength. The beam splitter then reflects this second signal towards receiver 414. Thus, data in the first and second wavelengths is effectively routed to and from transmitter 410, receiver 414, and cable 406 by beam splitter 402. Of course, beam splitter 402 could also be configured to pass the signals containing the second wavelengths intended for receiver 414 and reflect the signals containing the first wavelengths received from transmitter 410. Beam splitter 404, transmitter 412, receiver 416, and cable 408 operate similarly, except transmitter 412 transmits signals along the second wavelength and receiver 416 receives signals along the first wavelength.

Of course, a number of other currently known and future developed devices for separating wavelengths are compatible with the transceiver module. These may include, by way of example only, a WDM fiber optic splitter manufactured by Thor Labs, part number WD202B.

By way of example, the optical transceiver module of FIG. 4 can be implemented as a Small Form Factor Pluggable ("SFP") bi-directional transceiver module. Such transceiver modules are configured for Gigabit Ethernet and/or Fibre Channel and/or Sonet compliance. Moreover, these transceiver modules can operate over a wide range of temperatures. For example, some of these transceiver modules are effective over a temperature range of about 80° C., such as from about −10° C. to about +70° C. Of course, such embodiments and associated operating parameters are exemplary only, and are not intended to limit the scope of the invention in any way. Other embodiments of the invention may be implemented in other dual cable compatible transceiver modules.

Although an SFP bi-directional optical transceiver module that used complementary wavelengths has been described above, exemplary embodiments of the invention can be practiced with substantially any bi-directional optical transceiver modules that operate in this or other ways. For instance, other bi-directional optical transceiver modules can include a total of four lasers divided into two pairs of two lasers each. The two lasers in each pair have the two complementary wavelengths. When used to communicate using bi-directional optical signals, only one of the two lasers in each pair is used. Moreover, the particular laser of the pair is selected so that complementary wavelengths are transmitted over the optical fiber. The selection process uses a negotiation process between one optical transceiver module at a first end of the optical fiber and the corresponding other optical transceiver module at the other end of the fiber. Although this type of bi-directional optical transceiver module is generally more complex and expensive compared to the modules of FIG. 4, these and other modules can also be used according to the invention to interoperate with legacy communications devices that support only unidirectional communication.

Further, it will be understood that although reference is made to the transceiver module being an SFP bi-directional transceiver module, it can be understood that the optical transceiver module can be a 10 Gigabit Small Form Factor Pluggable (XFP) bi-directional transceiver module. As with the SFP bi-directional transceiver module, the XFP bi-directional transceiver module can mount to a compatible communication device or unit and can operate in both bi-directional and unidirectional modes.

2. Pad Architecture for Interoperability between Legacy and Bi-Directional Components To facilitate interoperability of the above-described bi-directional transceiver modules with both legacy and bi-directional communication devices, the pad architecture and associated connectors of the modules are modified to enable legacy communication devices to communicate with bi-directional components or modules in a way that enables backwards compatibility while using the bi-directional components for unidirectional communication. Although exemplary embodiments of the invention can be implemented using any of a variety of existing pad architectures and connectors that are otherwise used in conventional unidirectional communication, the invention will be described in detail below in the context of a twenty pad connector that is adapted from the SFP MSA standard. When the invention is practiced in accordance with standards applicable to XFP modules, a thirty pad connector or a thirty pad architecture can be used. More generally, the invention may be practiced with a variety of different optical modules having a variety of different number of pads, whether a greater or lesser number of pads than provided for in the SFP MSA standard or any standards associated with a XFP module.

A typical pad architecture and connector for providing an interface between a communications device and a unidirectional optical transceiver module includes pads for transmitting and receiving data using a single transmitter optical sub-assembly (TOSA) and a single receiver optical sub-assembly (ROSA). Additional pads help to diagnose, disable and otherwise operate an optical transceiver module that includes a single TOSA and a single ROSA. A legacy communications device has this type of pad architecture and connector, as does a legacy unidirectional transceiver module. The present invention changes the existing pad architecture so that a bi-directional transceiver module can operate with either legacy or bi-directional communication devices.

Figure 5A:
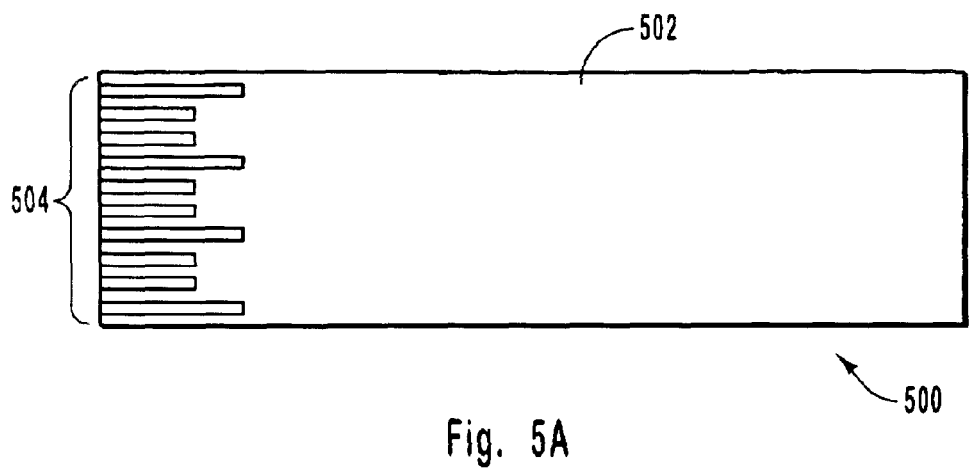
FIG. 5A illustrates a top view of a printed circuit board capable of being used in the exemplary transceiver modules of the present invention.

FIG. 5A shows a top view of an exemplary printed circuit board (PCB), designated generally as reference numeral 500. The PCB 500 is found in, for example, SFP transceiver module packages such as those described above with respect to FIGS. 3 and 4. PCB 500 includes a substrate 502 on which is mounted a series of electrical pads 504 for connecting PCB 500 to an optoelectronic device, such as a panel or the like, configured for receiving the connector. It should be noted that PCB 500 can also have a series of pads located on the opposite side of substrate 502, these pads being below pads 504. In general, substrate 502 can also include numerous electrical components and circuits, but for clarity such components and circuits are not shown. These electrical components and circuits can include, but not limited to, the transmitter to transmit data via a light signal, a receiver to receive inbound light signals, and such other components and circuits typically associated with a TOSA and/or ROSA.

Figure 5B:
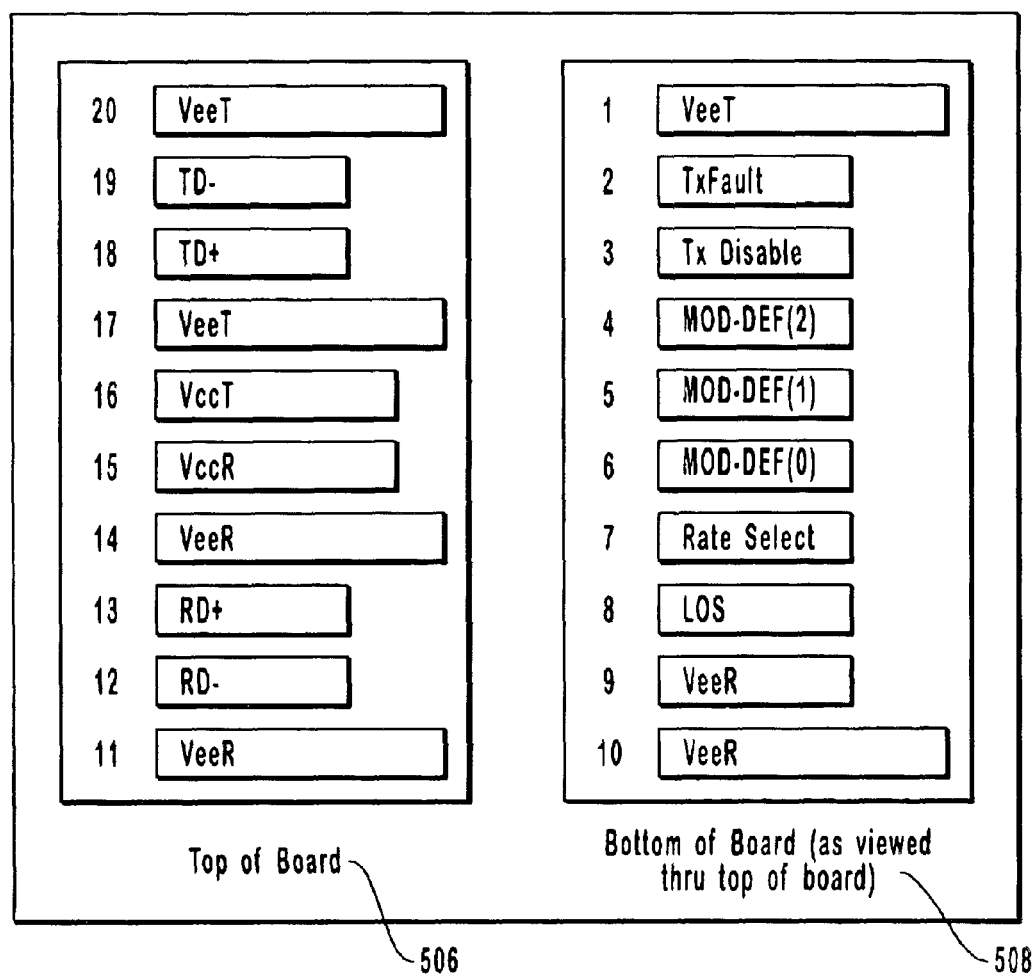
FIG. 5B shows top and bottom views of the pad architecture used in SFP optical transceiver modules.

FIG. 5B illustrates the standard configuration and pad layout for the PCB found in a SFP transceiver module according to the SFP MSA standard. Note that pads 11 through 20 are located on a top 506 of the PCB, and pads 1 through 10 are located on a bottom 508 of the PCB (as viewed through the top). For the sake of completeness, specific names and functions of the pad designations under the SFP MSA are discussed in the following paragraphs. However, this information is also outlined on page 21 of the SFP MSA, dated September 14, 2000, and which was previously incorporated by reference. A similar list of pads can be obtained for an XFP module.

Starting with the bottom of the PCB, pad number 1 is called VeeT, and functions as the transmitter ground. Pad number 2 is called TX Fault and functions as a transmitter fault indication. It is an open collector/drain output and functions in either a high or low state. In one configuration, when the state of the signal propagating to or from pad 2 is high, output indicates a laser fault of some kind, whereas a low state indicates normal operation. Pad number 3 is called TX Disable and functions as a transmitter disable to shut down the transmitter optical output. Pad number 4 is called MOD-DEF2 and functions as a data line for a two wire serial interface for a serial ID. Pad number 5 is called MOD-DEF1 and functions as a clock line for a two wire serial interface for a serial ID.

With continued reference to FIG. 5B and the bottom of the PCB, pad number 6 is called MOD-DEF0 and is grounded by the module to indicate that the module is present. Pad number 7 is called Rate Select and functions to select between full or reduced receiver bandwidth. Pad number 8 is called LOS (Loss of Signal) and functions as an open collector/drain output and functions in either a high or low state. When in a high state, this output indicates the received optical power is below the worst-case receiver sensitivity (as defined by the standard in use). When in a low state, this output indicates normal operation. Pad numbers 9 and 10 are called VeeR and both function as a receiver ground.

With continued reference to FIG. 5B, and switching to the top side of the PCB, Pad number 11 is called VeeR and functions as a receiver ground. Pad numbers 12 and 13 is called RD−/RD+, respectively. These are the differential receiver outputs. They are AC coupled 100Ω differential lines which should be terminated with 100Ω (differential) at the user SERDES. The AC coupling is done inside the module and is thus not required on the host board. Pad number 14 is called VeeR and functions as a receiver ground. Pad number 15 is called VccR and provides receiver power.

With continued reference to FIG. 5B and the top side of the PCB, pad number 16 is called VccT and provides transmitter power. Pad number 17 is called VeeT and functions as the transmitter ground. Pad numbers 18 and 19 are called TD+/TD− respectively. These are the differential transmitter inputs. They are AC-coupled, differential lines with 100Ω differential termination inside the module. The AC coupling is done inside the module and is thus not required on the host board. The inputs will accept differential swings of 500–2400 mV (250–1200 mV single-ended), though it is recommended that values between 500 and 1200 mV differential (250–600 mV single-ended) be used for best EMI performance. Pad number 20 is called VeeT and functions as the transmitter ground. Pads 1, 9, 10, 11, 14, 17 and 20, (all VeeR or VeeT) can be internally connected within the SFP module.

To allow the bi-directional transceiver modules of the present invention to operate with either legacy or bi-directional communication devices, the architecture described with respect to FIG. 5B is modified in accordance with the table included in FIG. 5C. The table of FIG. 5C sets forth the pad numbers of the connector in column 510, the conventional use of these pads according to the SFP MSA standard, which was detailed in the paragraphs above, in column 512, and the adaptation and change in the functionality of the pads according to the present invention in column 514. Similar changes can be made to the pad definitions for an XFP module. For instance, changing the operation of four pads of the XFP bi-directional transceiver module enables the XFP to operate in bi-directional or unidirectional modes.

In general, the conventional pad structure is adapted according to exemplary embodiments of the invention to use the pads that would otherwise communicate data with the single receiver and the single transmitter in a unidirectional module. As shown in FIG. 5C, the pads in this embodiment include pads 12, 13, 18 and 19. In conventional operation, these four pads communicate data with the single transmitter and the single receiver in a unidirectional module as shown in column 512. According to this exemplary embodiment, however, these four pads are used to communicate with one of the two receivers and one of the two transmitters of a bi-directional optical transceiver module. The transmitter is selected to communicate over one of the two optical fibers connected to the module and the receiver is selected to communicate over the other of the two optical fibers.

In column 514 of FIG. 5C, the receiver pads 12 and 13 are designated as R1+ and R1−, while the transmitter pads 18 and 19 are designated as T1+ and T1−. Using this convention, the numerals 1 and 2 refer to the wavelengths 1 and 2 of the referenced receivers and transmitters. In general, the receiver having wavelength 1 and the complementary transmitter having wavelength 1 are in different transceivers within the bi-directional transceiver module or, in other words, are connected with different optical fibers. Receiver 1 and transmitter 1 are those that operate using wavelength 1, while receiver 2 and transmitter 2 are those that operate using wavelength 2. An example of this configuration is shown in FIG. 3.

In addition, another set of four pads are used for communicating data with the other transmitter and receiver in the bi-directional optical transceiver module. The pads for this purpose are selected from among the expendable support pads that are defined in the SFP MSA standard discussed above with reference to FIG. 5B. An example of the pads that are suitable for this use is shown in FIG. 5C, column 514, in which pads 6 and 7 are designated as T2+ and T2− pads for use with the transmitter having wavelength 2 and pads 9 and 10 are designated as R2+ and R2− pads for use with the receiver having wavelength 2. In situations where both the communications device and the associated optical transceiver module are compatible with bi-directional communication, these pads (e.g., pads 6, 7, 9 and 10) are used to communicate data with the transmitter and the receiver having wavelength 2. If the communications device or the optical transceiver module are legacy components and do not support bi-directional communication, these pads 6, 7, 9 and 10 are idle, since the optical transceiver module is used only for unidirectional communication. The pads that are used for the complementary transmitter and receiver having wavelength 2 can instead be other pads that have conventional uses as described in column 512 that are also not critical for operating the optical transceiver module.

In order to achieve the ability to communicate data between the communications device and the transmitters and receivers of the optical transceiver module while providing backwards compatibility with legacy components, the pads of the connectors are configured as shown in column 514 of FIG. 5C. The pad architecture of column 514 permits the transceiver module to operate in a unidirectional manner when interfacing with a legacy communications device and in a bi-directional manner when interfacing with a bi-directional communications device.

According to the exemplary embodiment, the specification defining the operation of the twenty pads in the SFP connector is adapted to provide backwards compatibility between unidirectional components and bi-directional components while enabling bi-directional communication to be used in situations where both the communications device and the optical transceiver module support bi-directional communication. It is again noted that the particular pads that are adapted for use in this manner can be different from those that are set forth in FIG. 5C. In this embodiment, pads 1, 4, 5, 11, 14, 15, 16, 17 and 20 of column 514 are essentially unchanged with respect to the corresponding pads in column 512. Pad 2 of column 514 is assigned to transmitter 1 for backwards compatibility purposes, although the bi-directional transceivers that can be used with the pad configuration of the exemplary embodiment can be designed to communicate the existence of a fault in either transmitter through the single pad 2. Pad 3 is used to disable the laser in the transmitters. Although pad 3 is nominally assigned to transmitter 1, the bi-directional transceivers that can be used with the pad configuration of the exemplary embodiment can be designed to receive a digital disable signal for either of the transmitters through the single pad 3. Pad 8 indicates a loss of an optical signal at receiver 1. While pad 8 is assigned to receiver 1, it can be used to receive a loss of signal data from either receiver.

Pads 6 and 7 are adapted to communicate data to the transmitter 2. In the event the optical transceiver module has only a single transmitter, pads 6 and 7 are idle, and the unidirectional optical transceiver module can operate without the use of these pads. Similarly, pads 9 and 10 are adapted to receive data from the receiver 2 when the optical transceiver module is bi-directional and is being used for bi-directional communication. Pads 12 and 13 are used to receive data from receiver 1 as explained above. Pads 18 and 19 communicate data to transmitter 1.

The twenty pad connector discussed above with reference to FIGS. 5B and 5C is configured as a male portion of a connector assembly. This male portion is electrically part of bi-directional transceiver module containing two transmitters and two receivers. A complementary female portion can be found in patch panels and the like. According to the exemplary embodiment discussed above, the female portion in the patch panels is designed for unidirectional communication.

While the exemplary embodiment discussed above altered the pad configuration on the male portion of the connector, one skilled in the art will realize that it would be just as easy to modify the female portion of a connector that is configured for bi-directional communication. In this case, the female portion of the connector is in a patch panel configured for bi-directional communication. In keeping with an alternate embodiment, the pads on the female portion can be modified as described above to allow unidirectional communication to take place using a standard unidirectional transceiver module. In this case, the pads on the transceiver module would not be altered.

Exemplary embodiments of the present invention are thus adapted for at least two different scenarios. First, the pads on the PCB of a bi-directional transceiver module are altered as discussed above with reference to FIGS. 5B and 5C. This transceiver module will then function properly when connected either to a unidirectional panel or a bi-directional panel. Second, the pads on the female connector of a panel or the like are altered as discussed above with reference to FIGS. 5B and 5C. This panel will then function properly with either a bi-directional transceiver or a unidirectional transceiver. The exemplary embodiments of the present invention therefore provide a substantial improvement over standard unidirectional or bi-directional systems, neither of which will currently work with components designed for the other.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A connector that electrically connects an optoelectronic transceiver module configured for bi-directional communication and a communications device configured for unidirectional communication, the connector comprising:
   a first plurality of pads that are used to communicate with a first receiver and a first transmitter of the optoelectronic transceiver module, the first plurality of pads comprising;
      first transmitter pads; and
      first receiver pads;
   a second plurality of pads used to communicate with the communications device; and
   a third plurality of pads selectively operable to communicate with a second receiver and a second transmitter when used to connect the optoelectronic transceiver module to a communications device that is configured for bi-directional communication, the third plurality of pads comprising:
      second transmitter pads; and
      second receiver pads.

2. The connector of claim 1, wherein said communications device is configured to receive standard form factor pluggable (SFP) modules.

3. The connector of claim 2, wherein said second plurality of pads conforms to the SFP standard.

4. The connector of claim 1, wherein said communication device is configured to receive a 10 Gigabit standard form factor pluggable (XFP) module.

5. The connector of claim 1, wherein at least said first transmitter pads of said first plurality of pads communicate with said first transmitter of said optoelectronic transceiver.

6. The connector of claim 5, wherein at least said first receiver pads of said first plurality of pads communicate with said first receiver of said optoelectronic transceiver.

7. The connector of claim 1, wherein at least said second transmitter pads of said third plurality of pads communicate with said second transmitter of said optoelectronic transceiver.

8. The connector of claim 7, wherein at least said receiver pads of said third plurality of pads communicate with said second receiver of said optoelectronic transceiver.

9. The connector of claim 1, wherein a sum of the first plurality, the second plurality and the third plurality equals twenty.

10. The connector of claim 1, wherein a sum of the first plurality, the second plurality and the third plurality equals thirty.

11. A connector that electrically connects an optical transceiver module configured for unidirectional communication and a communications device configured for bi-directional communication, the connector comprising:
   a first plurality of pads that are used to communicate with a receiver and a transmitter of the optical transceiver module, the first plurality comprising:
      first transmitter pads; and
      first receiver pads;
   a second plurality of pads used to communicate with the communications device; and
   a third plurality of pads that are idle but that can be used to communicate with a second receiver and a second transmitter when used to connect an optical transceiver module configured for bi-directional communication to the communications device, the third plurality of pads comprising:
      second transmitter pads; and
      second receiver pads.

12. The connector of claim 11, wherein said transceiver module is selected from the group consisting of a standard form factor pluggable (SFP) module or a 10 Gigabit standard form factor pluggable (XFP) module.

13. The connector of claim 12, wherein said first plurality of pads conforms to the SFP standard.

14. The connector of claim 11, wherein at least said second transmitter pads of said third plurality of pads communicate with a second transmitter of an optoelectronic transceiver configured for bi-directional communication.

15. The connector of claim 14, wherein at least said second receiver pads of said third plurality of pads communicate with a second receiver of an optoelectronic transceiver configured for bi-directional communication.

16. The connector of claim 11, wherein a sum of the first plurality, the second plurality and the third plurality equals twenty.

17. The connector of claim 11, wherein a sum of the first plurality, the second plurality and the third plurality equals thirty.

18. An optoelectronic transceiver assembly providing backwards compatibility between a bi-directional component and a legacy unidirectional component, comprising:
   an optical transceiver module;
   a communications device that communicates electrically with the optical transceiver module, wherein one of the optical transceiver module and the communications device is configured for bi-directional communication and the other of the optical transceiver module and the communications device is configured only for unidirectional communication; and
   a connector that electrically connects the optical transceiver module and the communications device, wherein the connector includes:
      a first set of pads that are used to communicate with a first receiver and a first transmitter of the optical transceiver module, the first set of pads comprising:
         first receiver pads to communicate with the first receiver; and first transmitter pads to communicate with the first transmitter; and a second set of pads that are idle but can be used to communicate with a second receiver and a second transmitter when used to connect an optical transceiver module and a communications device that are both configured for bi-directional communication, the second set of pads comprising:

second receiver pads to communicate with the second receiver; and second transmitter pads to communicate with the second transmitter.

19. The optoelectronic transceiver assembly of claim 18, wherein said communications device is configured to receive a module selected from the group consisting of a standard form factor pluggable (SFP) module or a 10 Gigabit standard form factor pluggable (XFP) module.

20. The optoelectronic transceiver assembly of claim 19, wherein said transceiver module is one of a standard form factor pluggable (SFP) module, and a bi-directional transceiver module.

21. The optoelectronic transceiver assembly of claim 18, wherein said first set of pads conforms to the SFP standard.

22. The optoelectronic transceiver assembly of claim 18, wherein at least said second transmitter pads of said second set of pads communicate with a second transmitter of an optoelectronic transceiver configured for bi-directional communication.

23. The optoelectronic transceiver assembly of claim 22, wherein at least said second receiver pads of said second set of pads communicate with a second receiver of an optoelectronic transceiver configured for bi-directional communication.

24. The optoelectronic transceiver assembly of claim 18, wherein a sum of the first set, and the second set equals twenty.

25. The optoelectronic transceiver assembly of claim 18, wherein a sum of the first set, and the second set equals thirty.

* * * * *

UNITED STATES PATENT AND TRADEMARK OFFICE
CERTIFICATE OF CORRECTION

PATENT NO. : 6,951,426 B2
APPLICATION NO. : 10/791435
DATED : October 2, 2005
INVENTOR(S) : Andreas Weber It is certified that error appears in the above-identified patent and that said Letters Patent is hereby corrected as shown below:

Column 4
Line 41, change "system." to --systems.--

Column 5
Line 31, before "operating" insert --an--

Column 6
Line 3, change "components that is" to --components, which interoperability is--

Column 7
Line 32, after "receiver" change "326" to --328--
Line 34, change "320, 326," to --320, 328,--
Line 39, change "320, 326," to --320, 328,--
Line 55, change "second" to --first--
Line 57, change "326" to --322--

Column 8
Line 28, after "wavelengths" change "is" to --are--

Column 10
Line 4, change "but not limited" to --but are not limited--
Line 16, remove boldfacing from "21"
Line 17, remove boldfacing from "14, 2000"
Line 48, after "12 and 13" change "is" to --are--

Column 11
Line 36, change "R1+and R1–" to --R1– and R1+--

UNITED STATES PATENT AND TRADEMARK OFFICE
CERTIFICATE OF CORRECTION

PATENT NO. : 6,951,426 B2
APPLICATION NO. : 10/791435
DATED : October 2, 2005
INVENTOR(S) : Andreas Weber It is certified that error appears in the above-identified patent and that said Letters Patent is hereby corrected as shown below:

Column 14
Line 15, after "first plurality" insert --of pads--

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

PATENT NO.        : 6,951,426 B2
APPLICATION NO.   : 10/791435
DATED             : October 4, 2005
INVENTOR(S)       : Andreas Weber It is certified that error appears in the above-identified patent and that said Letters Patent is hereby corrected as shown below:

Column 4
Line 41, change "system." to --systems.--

Column 5
Line 31, before "operating" insert --an--

Column 6
Line 3, change "components that is" to --components, which interoperability is--

Column 7
Line 32, after "receiver" change "326" to --328--
Line 34, change "320, 326," to --320, 328,--
Line 39, change "320, 326," to --320, 328,--
Line 55, change "second" to --first--
Line 57, change "326" to --322--

Column 8
Line 28, after "wavelengths" change "is" to --are--

Column 10
Line 4, change "but not limited" to --but are not limited--
Line 16, remove boldfacing from "21"
Line 17, remove boldfacing from "14, 2000"
Line 48, after "12 and 13" change "is" to --are--

Column 11
Line 36, change "R1+and R1–" to --R1– and R1+--

UNITED STATES PATENT AND TRADEMARK OFFICE
CERTIFICATE OF CORRECTION

PATENT NO.       : 6,951,426 B2
APPLICATION NO.  : 10/791435
DATED            : October 4, 2005
INVENTOR(S)      : Andreas Weber It is certified that error appears in the above-identified patent and that said Letters Patent is hereby corrected as shown below:

Column 14
Line 15, after "first plurality" insert --of pads--

This certificate supersedes Certificate of Correction issued November 13, 2007.

Signed and Sealed this

Eighteenth Day of December, 2007

JON W. DUDAS
*Director of the United States Patent and Trademark Office*